United States Patent Office 3,452,005
Patented June 24, 1969

---

3,452,005
4-PREGNENE-11β-OL-3,20-DIONE-[17α,16α-d]-OXAZOLINES
Joseph Ernst Thiemann, Como, Giancarlo Lancini, Pavia, and Giangiacomo Nathansohn, Milan, Italy, assignors to Lepetit S.p.A., Milan, Italy
No Drawing. Filed Dec. 28, 1967, Ser. No. 694,109
Claims priority, application Great Britain, Jan. 13, 1967, 1,900/67
Int. Cl. C07c *173/10;* A61k *17/00*
U.S. Cl. 260—239.55
4 Claims

---

ABSTRACT OF THE DISCLOSURE

The subject matter of the present application is a new class of steroido-oxazolines, which are prepared by a fermentative process, using a fungus, selected from the classes *Fungi imperfecti* and Phycomycetes, as the agent capable of introducing a hydroxyl in position 11.

---

The compounds show an anti-inflammatory and hormone-like activity.

This invention is concerned with new steroids. More particularly, the steroids with which this invention is concerned are steroido-oxazolines of the formula

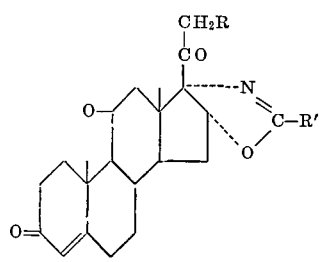

wherein R represents hydrogen, hydroxy or an acyl radical, R' represents hydrogen, lower alkyl or phenyl.

The new compounds show a high degree of pharmacological activity as anti-inflammatory and hormone-like agents.

The process for the preparation of the new steroido-oxazolines consists in subjecting a steroido-oxazoline of the formula

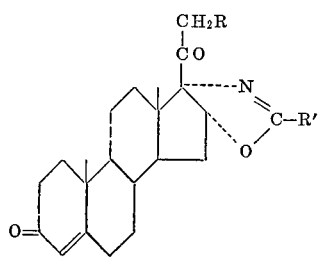

in which R and R' have the above significance, to the action of a fungus selected from the classes *Fungi imperfecti* and Phycomycetes.

In carrying out the process according to the present invention, a fungus of the genera Curvularia, Cunnighamella and Absidia, such as *Curvularia lunata*, *Cunninghamella blackesleeana* or *Absidia orchidis* and other species, is cultivated aerobically in a suitable nutrient medium and allowed to act upon a steroido-oxazoline of the formula given above and embracing the starting substances. During the growth of the microorganism a hydroxy group is introduced into position 11 of the steroido-oxazoline due to the oxygenating activity of enzymes produced by the microorganism.

A suitable nutrient medium must contain a carbon source, a nitrogen source and mineral elements. Useful carbon sources include starch dextrose, sucrose, galactose, xylose, glycerol and other carbohydrates and poly-alcohols, as well as other natural sources of carbohydrates, such as corn steep liquor, cotton seed meal and others. Useful sources of nitrogen include some of the above materials, such as corn steep liquor, cotton seed meal, other substances such as beef extract, yeast, peptones, aminoacids, digested proteins in general and other proteinaceous materials. Inorganic nitrogen sources are also useful, such as urea, nitrates, ammonium salts and the like.

The necessary minerals are either present in the same materials above listed when they are used in a crude state or are present in water used for the preparation of the medium. When it is desired to supplement the medium, an amount of inorganic substances is added which is suitable for providing the medium with cations and anions, such as phosphate, sulfate, chloride, alkali and alkaline earth metals, iron, manganese, cobalt and others.

The steroid to be subjected to 11-hydroxylation can be added prior to or after inoculation of the medium with the culture of the microorganism.

Fermentation is then continued for 12–120 hours at a temperature between about 26 and 32° C. At the end of fermentation, if desired, the medium is filtered from the mycelium and the 11-hydroxylated steroid is extracted with a water-insoluble organic solvent in which the steroid dissolves, and the organic extract is evaporated in vacuo to dryness or to a small volume. In the latter case, the addition to the concentrated solution of the steroid of a solvent miscible with the solvent used for extraction, but in which the steroid is insoluble causes precipitation of the product. This can be then purified chromatographically or by any suitable procedure, such as recrystallization.

Alternatively, after a good mycelium growth has been obtained in a medium of the composition as above, an amount of the mycelium is collected and transferred to a phosphate buffer solution at pH between 7.0 and 7.5 and contacted with the steroid to be transformed. The steroid is then isolated from the liquor by extraction as above indicated.

The compounds of the invention display a high anti-inflammatory activity in comparison with other known steroids, endowed with the same pharmacological properties, as for instance the hydrocortisone. The results of this activity, evaluated through the granuloma pellet in rats, are reported in Table 1. The products, dissolved or suspended in 10% acacia gum, were administered by oral route to male Wistar rats, weighing 120–150 g.

TABLE 1

| Compound of example | Dose, mg./kg. p. os | No. of animals | Decrease, percent of granuloma |
|---|---|---|---|
| 1 | 5 | 7 | −39.6 |
| 2 | 5 | 7 | −34 |
| 3 | 5 | 7 | −38.4 |
| Hydrocortisone | 5 | 7 | −25 |

The compound of Example 3 was also found to possess a gluconeogenetic activity. The experiments were carried out, using surrectomized Wistar male rats, according to the method described by Olson and al. in Endocrinol 35, 40, 1944. Comparing the results of the compound of the invention with the ones obtained with hydrocortisone, under the same experimental conditions, the higher activity of the former results apparent. The following Table 2 summarizes the results found in the two cases.

TABLE 2

| Compound of example | Dose, μg./rat | No. of rats | Hepatic glycogen ±S.E., μg. glucose/ 100 g. of rat |
|---|---|---|---|
| 3 | 500 | 10 | 12.84±1.14 |
|  | 2,000 | 10 | 33.79±2.34 |
| Hydrocortisone | 500 | 10 | 7.04±0.97 |
|  | 2,000 | 10 | 20.05±1.43 |
| Controls |  | 10 | 1.18±0.06 |

The following are examples of the claimed process.

EXAMPLE 1

Pregn-4-ene-11β,21-diol-3,20-dione-[17α,16α-d]-2'-methyloxazoline 21-acetate

Several 500 ml.-Erlenmeyer flasks containing each 100 ml. of the following medium

```
Dextrose _____g-- 10.0
Soybean meal _____g-- 5.0
Peptone _____g-- 5.0
Basamin Busch _____g-- 3.0
KH2PO4 _____g-- 5.0
NaCl _____g-- 5.0
Silicone _____ml-- 0.1
Dist. water q.s. to _____litre-- 1
```

(pH before sterilization adjusted to 6.8 with NaOH) are inoculated with a 4 days-slant culture of *Curvularia lunata* NRRL 2380. After 24 hours of incubation on rotative shaker (250 r.p.m.) at 28° C. a good mycelium growth is obtained. Four litres of medium of the above composition is inoculated in a prefermentation jar with 5 percent v./v. of the above obtained culture and incubated under the following conditions: air 1.5 l./l./min.; agitation 800 r.p.m.; temperature 28° C.; time 24 hours.

Two hundred milliliters of the broth from the above fermentation are used to inoculate a new fermentation jar containing 4 litres of the same medium as above. Fermentation is carried out under identical conditions as in the preceding step. After 24 hours the mycelium is collected by filtration.

The isolated wet mycelium (weight about 300 g.) is suspended in 4 litres of phosphate buffer M/15 of pH 7.3 in a fermentation vessel and the suspension is stirred at 800 r.p.m. for 10 minutes. Air is introduced at a rate of 1.5 litres per litre of liquid per minute and the temperature is adjusted to 28° C.

Pregn-4-ene-21-ol-3,20 - dione - [17α,16α-d]-2'-methyloxazoline 21-acetate in an amount corresponding to 0.5% (w./v.) of the medium is dissolved in 40 ml. of acetone and added to the medium, and the mass is maintained under the above described conditions of agitation, air introduction and temperature for 24 hours. The conversion is stopped at this point by the addition of chloroform.

The mixture is filtered, the mycelium is repeatedly washed with chloroform and the filtrate is extracted with chloroform. The combined chloroform washings and extracts are evaporated in vacuo to a small volume and petroleum ether is added causing formation of a precipitate. The crude product is purified by countercurrent partition with a mixture methanol: water: chloroform: ligroin 2:1:2:1. Yield 0.5 g. of pregn-4-ene-11β,21-diol-3,20-dione-[17α,16α-d]-2'-methyloxazoline, which with acetic anhydride in pyridine gives the 21-acetate, M.P. 224–225° C., $[\alpha]_D^{20}$+108° (c.=0.5, CHCl3).

The identity of the compound obtained is confirmed by subjecting it to the activity of the enzyme produced during the fermentation of *Corynebacterium simplex* SCH 2141 under conditions commonly used for introducing a double bond into position 1(2) of the steroid nucleus. Through said procedure there is obtained the known pregna-1,4-diene-11β,21 - diol - 3,20-dione-[17α,16α-d]-2'-methyloxazoline-21-acetate, M.P. 256–257° C., λ max. 241–243 (CH3OH).

The starting compound necessary for carrying out the procedure described in this example is prepared through the following steps.

To a mixture of 5 g. of pregn-5-ene-3β-ol-20-one-[17α,16α-d]-2'-methyloxazoline, 40 ml. of tetrahydrofuran, 40 ml. of methanol, 7.5 g. of calcium oxide and 0.11 g. of azo-bis-isobutyronitrile a solution of 5 g. iodine in 25 ml. of tetrahydrofuran and 15 ml. of methanol is gradually added under vigorous stirring. The mixture is then filtered, the filtrate is evaporated to dryness in vacuo and the residue is dissolved in 80 ml. of dichloromethane. The organic solution is washed with sodium thiosulfate, then with water, then evaporated to dryness in vacuo.

This residue (the 21-iododerivative of the steroid) is dissolved in 40 ml. of acetone and added to a solution, warmed to 50–60° C., of 28 ml. of acetic acid, 14 ml. of acetone and 50 ml. of triethylamine, then the mixture is refluxed for 90 minutes.

The acetone is distilled off, then 150 ml. of warm water are added gradually. After cooling the formed precipitate is collected and washed. Yield 4.8 g. pregn-5-ene-3β,21-diol-20-one-[17α,16α-d]-2'-methyloxazoline 21-acetate, M.P. 232–234° C., $[\alpha]_D^{20}$—20.4° (c.=0.5, CHCl3).

An Oppenauer oxidation is carried out on the obtained steroid according to well known procedures, using aluminum isopropoxide and cyclohexanone in toluene. From 35 g. of starting pregn-5-ene 30 g. (yield 86%) of pregn-4-ene-21-ol-3,20 - dione - [17α,16α-d]-2'-methyloxazoline 21-acetate, M.P. 204–206° C., $[\alpha]_D^{20}$+86° (c.=0.5, CHCl3), $E_{1cm}^{1\%}$ 401.8, λmax. 240 mμ (CH3OH)

are obtained.

EXAMPLE 2

Pregn-4-ene-11β-ol-3,20-dione-[17α,16α-d]-oxazoline

Prepared exactly as described in Example 1, starting from pregn-4-ene-3,20-dione-[17α,16α-d]-oxazoline and using as fermenting organism *Cunninghamella blackesleeana* NRRL 8688A. The obtained steroido-oxazoline has M.P. 198–200° C.

EXAMPLE 3

Pregn-4-ene-11β,21-diol-3,20-dione-[17α,16α-d]-2-methyloxazoline

Prepared as described in Example 1, starting from pregn-4-ene-21 - ol - 3,20 - dione-[17α,16α-d]-2'-methyloxazoline and using as fermenting organism *Absidia orchidis* ATCC 6647. The obtained steroido-oxazoline has M.P. 235° C.

We claim:
1. A steroido-oxazoline of the formula

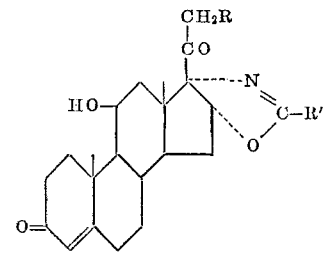

wherein R is a member of the class consisting of hydrogen, hydroxyl and acyloxy, R' is a member of the class consisting of hydrogen, lower alkyl and phenyl.

2. Pregn-4-ene-11β,21 - diol - 3,20-dione-[17α,16α-d]-2'-methyloxazoline 21-acetate.

3. Pregn-4-ene-11β-ol - 3,20 - dione - [17α,16α-d]-oxazoline.

4. Pregn-4-ene-11β,21-diol-3,20 - dione-[17α,16α-d]-2'-methyloxazoline.

References Cited

UNITED STATES PATENTS

| | | |
|---|---|---|
| 2,658,023 | 11/1953 | Shull et al. _____ 195—51 |
| 2,844,513 | 7/1958 | Wettstein et al. _____ 195—3 |
| 3,118,814 | 1/1964 | Von Werder et al. ____ 167—65 |

HENRY A. FRENCH, *Primary Examiner.*

U.S. Cl. X.R.

195—51; 260—999